(12) United States Patent
Khan

(10) Patent No.: US 6,242,831 B1
(45) Date of Patent: Jun. 5, 2001

(54) REDUCED STICTION FOR DISC DRIVE HYDRODYNAMIC SPINDLE MOTORS

(75) Inventor: Raquib U. Khan, Pleasanton, CA (US)

(73) Assignee: Seagate Technology, Inc., Scotts Valley, CA (US)

( * ) Notice: Subject to any disclaimer, the term of this patent is extended or adjusted under 35 U.S.C. 154(b) by 0 days.

(21) Appl. No.: 09/440,385

(22) Filed: Nov. 15, 1999

Related U.S. Application Data

(60) Provisional application No. 60/119,774, filed on Feb. 11, 1999.

(51) Int. Cl.[7] ............................. H02K 7/08; G11B 17/02
(52) U.S. Cl. ......................... 310/90; 310/45; 310/67 R; 360/99.08; 384/907
(58) Field of Search ........................... 310/91, 45, 67 R; 384/907; 360/99.08, 99.07

(56) References Cited

U.S. PATENT DOCUMENTS

| | | | |
|---|---|---|---|
| 5,366,298 | * 11/1994 | Toshimitsu et al. | 384/107 |
| 5,575,567 | * 11/1996 | Brown | 384/132 |
| 5,678,929 | 10/1997 | Parsoneault et al. | 384/112 |
| 5,742,518 | 4/1998 | Gui et al. | 364/508 |
| 5,815,346 | * 9/1998 | Kimmal et al. | 360/103 |
| 5,841,607 | 11/1998 | Khan et al. | 360/99.08 |
| 5,997,179 | * 12/1999 | Khan et al. | 384/107 |
| 6,007,896 | * 12/1999 | Bhushan | 428/141 |

OTHER PUBLICATIONS

Fluorad™ Technical Information, Fluorochemical Specialties, Fluorad™ Fluorochemical Coating FC–722.

Product Characteristics: NyeBar–Type K.

* cited by examiner

*Primary Examiner*—Burton Mullins
(74) *Attorney, Agent, or Firm*—Fish & Richardson P.C.

(57) ABSTRACT

A reduced stiction hydrodynamic spindle motor is provided for reducing the starting torque or power of disc drive motors. The reduced stiction motor includes a low surface energy coating having a surface energy less than the surface tension of the motor lubricant.

20 Claims, 7 Drawing Sheets

$F \propto 1/H$
$F \propto$ SURFACE AREA
$\Theta < 90$

REDUCED STICTION FOR DISC DRIVE HYDRODYNAMIC SPINDLE MOTORS

CROSS REFERENCE TO RELATED APPLICATIONS

This application claims priority from U.S. Provisional Application No. 60/119,774, filed Feb. 11, 1999, the entire contents of which are herein incorporated by reference.

BACKGROUND OF THE INVENTION

This invention relates to a reduction in the stiction for spindle motors.

Disc drive data storage devices use rigid discs coated with a medium, e.g. a magnetizable medium, for storage of digital information in a plurality of data tracks. The information is written to and read from the discs using a transducing head mounted on an actuator mechanism which moves the head from track to track across a surface of the disc under control of electronic circuitry. The discs are mounted for rotation on a spindle motor which causes the discs to spin and the surfaces of the disc to pass under the heads.

Spindle motors typically include a rotor that rotates about a fixed shaft. During rotation, the radial pressure of the fluid, e.g., gas (air) or liquid, between the rotor and shaft acts as a hydrodynamic bearing to keep these components apart. For example, in a hydrodynamic gas bearing, the axial and/or radial pressure distribution of air is increased and the rotor rotates on a bearing of air about the fixed shaft. In many applications, a lubricant is located between the shaft and the rotor to reduce wear of the motor's surfaces.

SUMMARY OF THE INVENTION

In one aspect, the invention features a spindle drive motor including a drive mechanism means and a means for reducing stiction.

In another aspect, the invention features a reduced stiction drive mechanism for a spindle drive motor including a shaft and a rotor arranged for relative motion, a lubricant between the shaft and rotor, and a surface energy modifier between the lubricant and at least one of the shaft and rotor. The surface energy modifier has a surface energy effective to reduce stiction.

In another aspect, the invention features a computer disc drive including a spindle drive motor for rotating storage media. The spindle drive motor includes a shaft and a rotor arranged for relative motion, a lubricant between the shaft and rotor, and a surface energy modifier between the lubricant and at least one of the shaft and rotor. The surface energy modifier has a surface energy effective to reduce stiction.

Embodiments may include one or more of the following features. The shaft and the rotor can be spaced apart by about 0.5 to about 20 microns. The surface energy modifier can have a surface energy lower than the surface tension of the lubricant. Preferably, the surface energy modifier can have a surface energy about 2% lower than the surface tension of the lubricant. More preferably, the surface energy modifier can have a surface energy, about 20% to about 50% or more, lower than the surface tension of the lubricant. For example, the surface energy modifier has a surface energy of about 6 to about 14 dynes/cm and the lubricant has a surface tension of about 12 to about 80 dynes/cm. Each of the surface energy modifier and the lubricant, independently, can have a thickness of about 1 nm to about 2000 nm.

The surface energy modifier can be a fluorochemical polymer in a fluorocarbon solvent, e.g., Fluorad or Nye Bar-Type K, isosteric acid, or mixtures thereof. The lubricant can be a fluorinated polyether, a hydrocarbon, an ester, atmosphere moisture, or mixtures thereof.

Liquid lubricants include, but are not limited to, motor lubricants, e.g., fluorinated polyether, hydrocarbons, and esters; motor lubricant contaminants, e.g., hydrocarbon contaminants; atmospheric moisture; or mixtures thereof.

An advantage of embodiments of the invention is that stiction is reduced, thus lowering the starting power requirements of the motor. Stiction is a type of friction that occurs in the null position, i.e., "touch down," between two moving members, e.g., a motor journal (shaft) and sleeve (rotor). For instance, when a journal is in contact with a sleeve, liquids in the interface, such as lubricants, redistribute themselves, e.g., via capillary action between the sleeve and journal to form menisci around the contacting areas. The pressure inside a meniscus is lower than the pressure outside the meniscus, thereby leading to an additional force, namely, meniscus force, causing the two mating surfaces to be pulled closer together. Thus, in order to restart the motor, the stiction force between the journal and sleeve must be overcome.

Starting torque or power in a spindle motor is governed by many factors, such as the materials used, surface finish, friction coefficient of the surface, environmental condition, etc. In some instances, e.g., humid environments, the starting force or torque will be governed by the stiction between the touch down surfaces and any other materials on the surface, e.g., absorbed moisture and organic materials. Stiction can also result when one or both surfaces are coated with wear-resistant thin films or lubricants.

As stiction increases, the power consumption, i.e., starting torque or starting power, of the spindle motor must also increase so that the spindle motor can overcome the menisci forces. In situations of low power disc drive applications, e.g., portable battery powered laptop type computers, power consumption of the spindle motor cannot be increased and the available starting power may not be sufficient to overcome stiction. This situation renders the spindle drive motor inoperable. The reduced stiction spindle motor decreases the starting power consumption of the spindle motor and lowers the probability that the spindle motor will be inoperable. Reducing power consumption is particularly important in low power disc drive applications in which power conservation is extremely desirable.

Other features of the invention will be apparent from the following description of the preferred embodiments and from the claims.

DETAILED DESCRIPTION

Figure 1A:
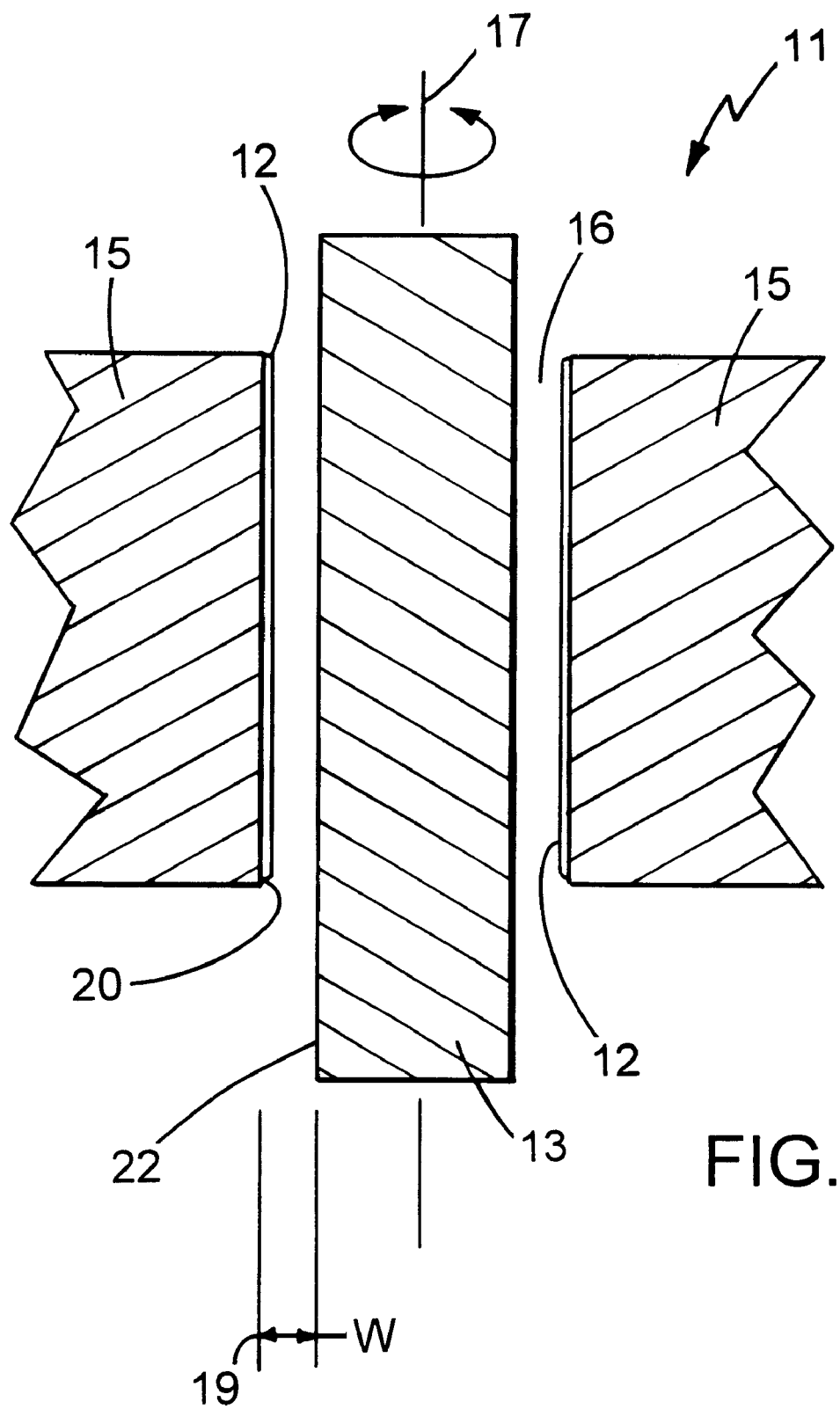
FIGS. 1A and 1B are cross-sectional partial side views of a drive mechanism for a spindle motor.

FIG. 1A shows a schematic view of the drive components 11 of a motor including a rotor 15 and a shaft 13, both of which are typically formed of metal or ceramic. Shaft 13 is received within a bore 16 of rotor 15. During operation, either shaft 13 or rotor 15 can be rotated about longitudinal axis 17. In either case, shaft 13 is approximately centered within bore 16 due to the increased radial pressure distribution of the fluid, e.g., air, between the shaft and the rotor forming gap 19. Gap 19 is located between shaft 13 and rotor 15 and has a width, w, typically of about 0.5 to about 20 microns.

Drive Components 11 includes a lubricant thin film 12 for lubricating either an inner surface 20 of rotor 15 or a radial surface 22 of shaft 13 during rotation. The thickness of lubricating thin film 12 can vary depending upon the design of the motor. The thickness of lubricating thin film is typically between about 1 nm to about 2000 nm. Typically, the thickness of lubricant thin film 12 is about an order of magnitude smaller than gap 19. For example, if gap 19 is 5 microns the thickness of lubricant thin film typically is about 500 nm or less. The lubricant has a surface tension lower than the surface energy of the shaft or rotor so that surface is wet. Examples of lubricants include, but are not limited to, fluorinated polyethers, hydrocarbons, and esters. Examples of fluorinated polyethers include Z-Dol 1000, Z-Dol 2000, Z-Dol 3000, AM2001, and Z-Tetraol. These fluorinated polyethers may be obtained froem Ausimont USA, Inc. located in Thorofare, N.J., and Nye Lubricants located in Dublin, Calif. Examples of hydrocarbons and esters include poly-alpha olefins and phosphate esters, respectively. An example of a phosphate ester is triphenyl phosphate available from Aldrich Chemical Company, Inc. located in Milwaukee, Wis. An example of a poly-alpha olefin is polypropylene available from Aldrich Chemical Company, Inc. located in Milwaukee, Wis. The lubricant may also be provided by making the shaft or rotor or both out of or coated with a low friction solid material, e.g., a fluoropolymer such as teflon, or by coating metals and other substrates with a low friction hard coating (e.g., silicon carbide and diamond like carbon).

Figure 1B:
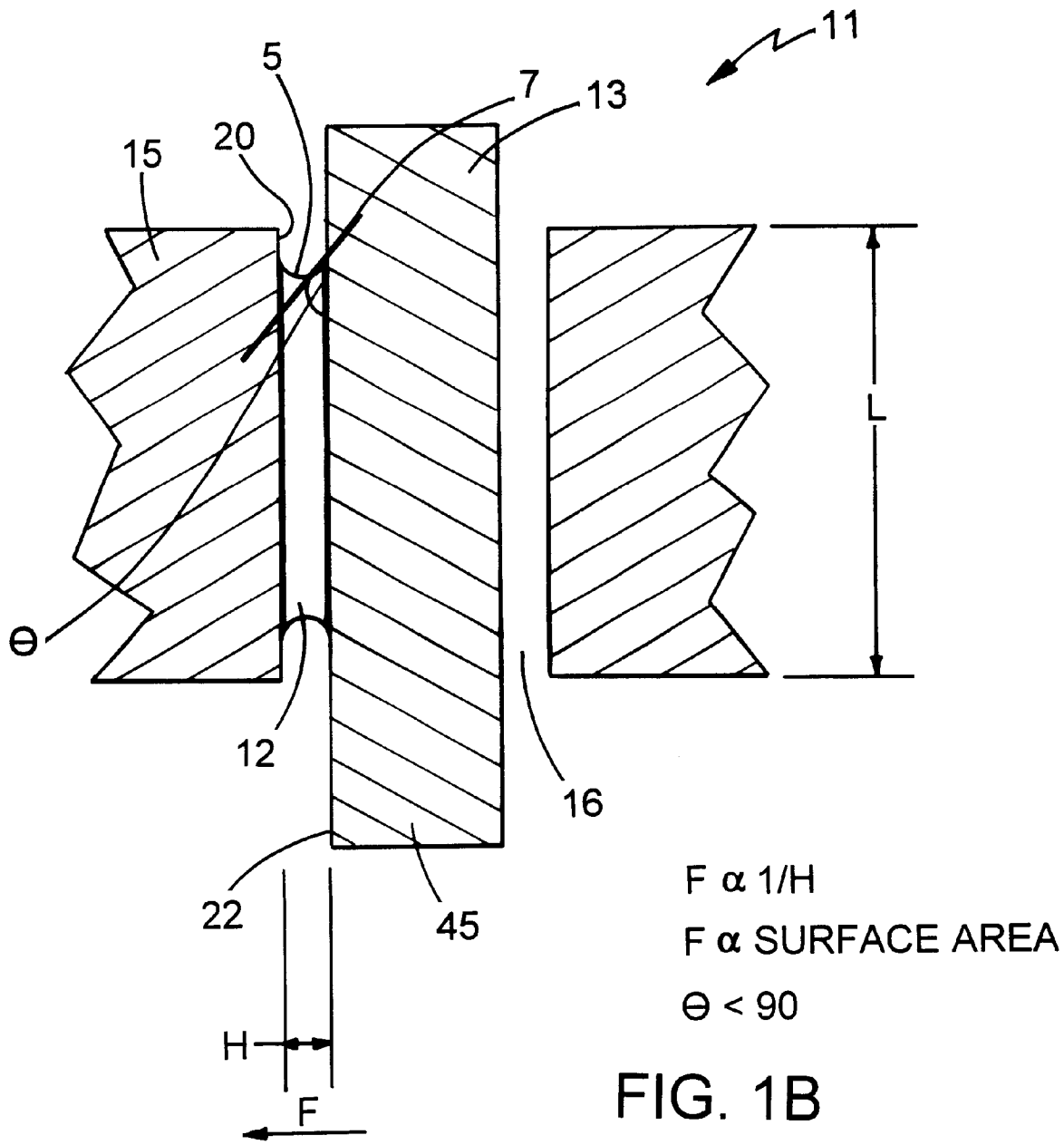

Referring now to FIG. 1B, when the motor is turned off, the rotating element, either rotor 15 or shaft 13, slows to a stop. Eventually, shaft 13 and rotor 15 touch down into a null position, i.e., the resting position of the shaft and rotor. In the null position, a side 45 of shaft 13 comes into contact with lubricant thin film 12, i.e., shaft 13 is no longer approximately centered within bore 16. In this configuration, lubricating thin film 12 will redistribute itself such that it wets both the radial surface of the shaft and the inner surface of the rotor near the null position. When the lubricant wets the surfaces, menisci 5 are formed near the null position resulting in an increase in the stiction between shaft 13 and rotor 15.

Surface wetting and menisci formation are governed by the surface energy effect. As shown in FIG. 1B, the meniscus force (F) is directly proportional to the total surface area (A) of menisci 5 interaction and inversely proportional to the distance (H) between shaft 13 and rotor 15. The total surface area of menisci interaction is determined by calculating the area of contact between the lubricant and the two surfaces of the rotor and shaft, i.e., proportional to the length of interaction (L) multiplied by the inner diameter of the rotor plus the length of interaction (L) multiplied by the outer diameter of the shaft. Thus, meniscus force (F) can be reduced by decreasing the total surface area (A) of menisci interaction or by increasing the distance (H) between the shaft and rotor.

Figure 2:
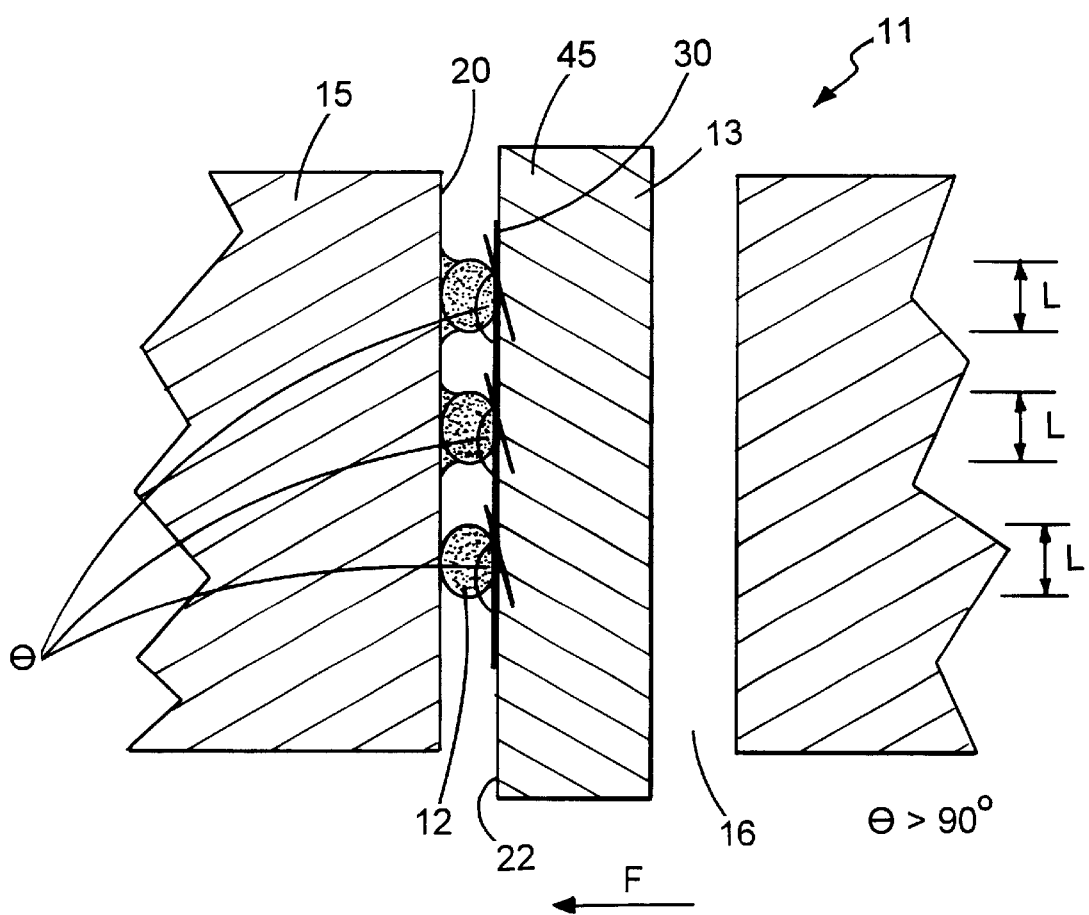
FIG. 2 is a cross-sectional partial side view of a drive mechanism in the null position including a surface energy modifier.

Referring now to FIG. 2, the menisci forces and surface wetting can be reduced without increasing the distance (H) between the rotor and shaft by applying a low surface energy coating 30 to radial surface 22 of shaft 13.

As long as the surface energy (dynes/cm) of the low surface energy coating is lower than the surface tension of the lubricant or contaminants in the lubricating thin film, the lubricant or contaminant will not wet the low surface energy coating. Rather, the low surface energy coating causes the lubricant or contaminant to bead or ball. The surface energy of low surface energy coating 30 is lower than the surface tension of lubricating thin film 12 creating a higher contact angle (θ), e.g., greater than 90 degrees, between lubricating thin film and the radial surface of the shaft, i.e., the lubricant will not efficiently wet the shaft. As a result of the lubricant higher contact angle, i.e., beading or balling, the total surface area (A) of lubricant menisci interaction is decreased. Thus, the stiction forces will be reduced.

Preferably, the low surface energy coating has a surface energy about 2% lower than the surface tension of the lubricant. More preferably, the low surface energy coating has a surface energy about 20% to about 50% lower or more, than the surface tension of the lubricant.

Examples of low surface energy coatings include but are not limited to isosteric acid and fluorochemical polymers suspended in fluorocarbon solvents. Examples of fluorochemical polymers in fluorocarbon solvents include Nye-Bar-Type K available from Nye Lubricants located in Dublin, Calif., and Fluorad™, available from 3M Corporation located in Minn. (surface energy of about 11–12 dynes/cm. Mixtures of such coatings can also be used. The coating can be applied by brushing, wiping, or spraying. The thickness of the low surface energy coating is similar to the thickness of lubricating thin film, e.g., about 1 nm to about 2000 nm.

Typically, the surface energies of the fluorochemical polymers (measured in dry films) are between about 6 to about 14 dynes/cm. The surface tension values of commonly used lubricants are between about 12 to about 80 dynes/cm. (Surface energy is used when referring to solids or films. Surface tension refers to liquids. Both are in units of dynes/cm.)

Figure 3A:
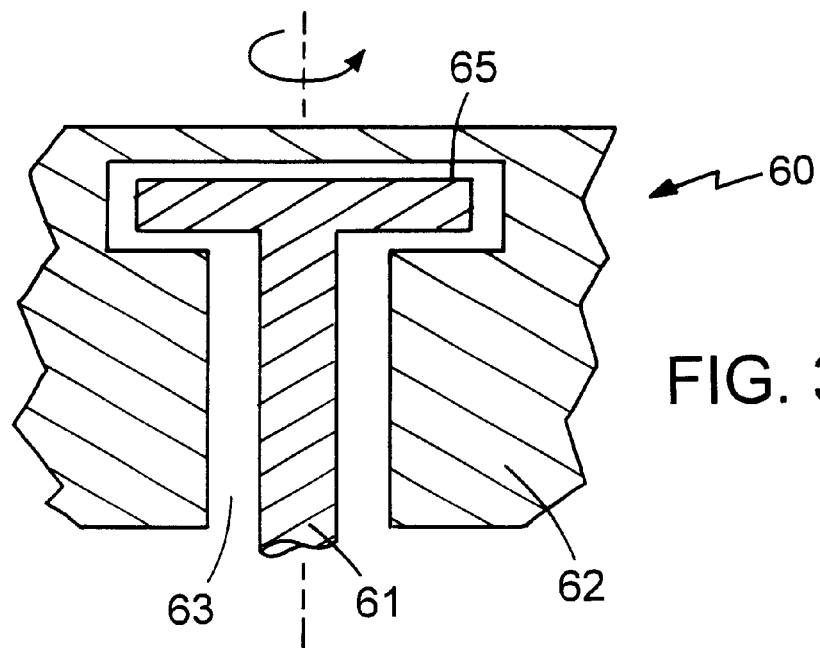
FIGS. 3A and 3B illustrate additional drive mechanism geometries.
Figure 3B:
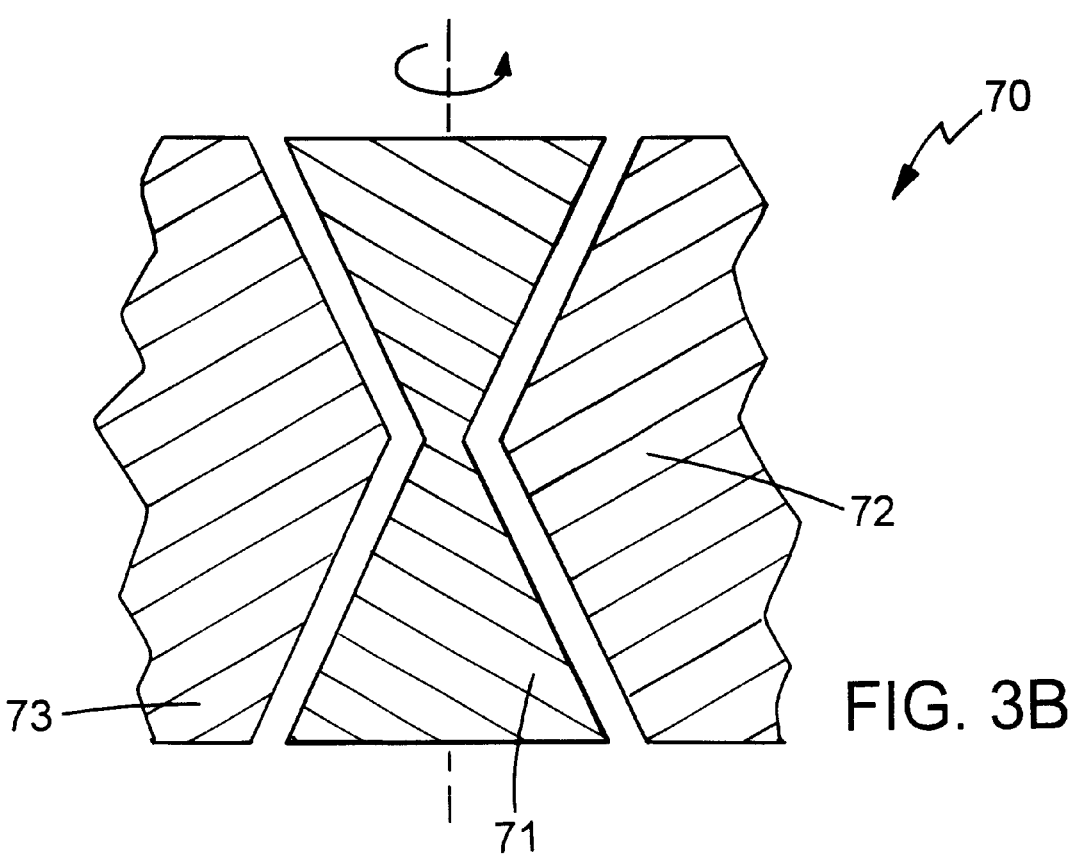

Referring to FIGS. 3A and 3B, other spindle motor mechanism geometries are illustrated. In the mechanism 60 of FIG. 3A, a T-shaped shaft 61 is arranged for relative rotation with respect to rotor 62 within bore 63. In the mechanism 70 of FIG. 3B, a narrow-waisted shaft 71 is arranged for relative rotation with respect to rotor 72 within bore 73. In both mechanisms of FIGS. 3A and 3B, the bore has a shape complimentary to the shaft. The high surface area of these arrangements can lead to substantial stiction. The surface of either the shaft or the rotor may include a low surface energy coating to reduce stiction. The coating may be applied to the entire surface of the shaft or the rotor or to only portions of those components, such as, a generally planar surface 65 of the T-shaped shaft shown in FIG. 3A.

Figure 4:
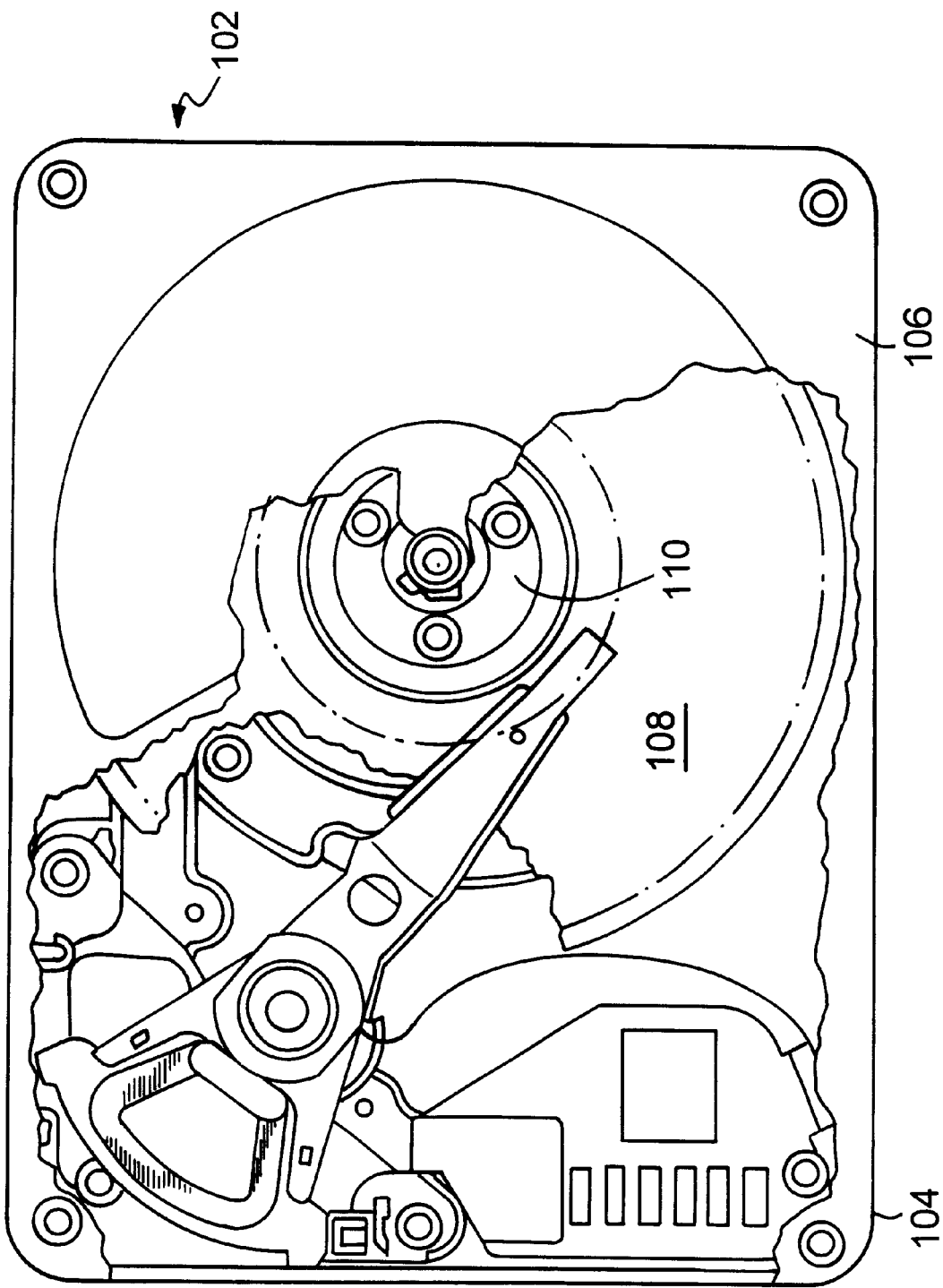
FIG. 4 is a diagrammatic view of a disc drive data storage device.

FIG. 4 is schematic view of a disc drive 102 for use with the present invention. Disc drive 102 includes a base member 104 to which internal components of the unit are mounted. Base member 104 couples to a top cover 106 which forms a sealed environment (cavity) for certain parts of disc drive 102. Disc drive 102 includes a plurality of discs 108 which are mounted for rotation on a spindle hydrodynamic motor 110. Examples of spindle motors employing hydrodynamic bearings can be found in U.S. Pat. No. 5,678,929 the entire contents of which are herein incorporated by reference.

Figure 5:
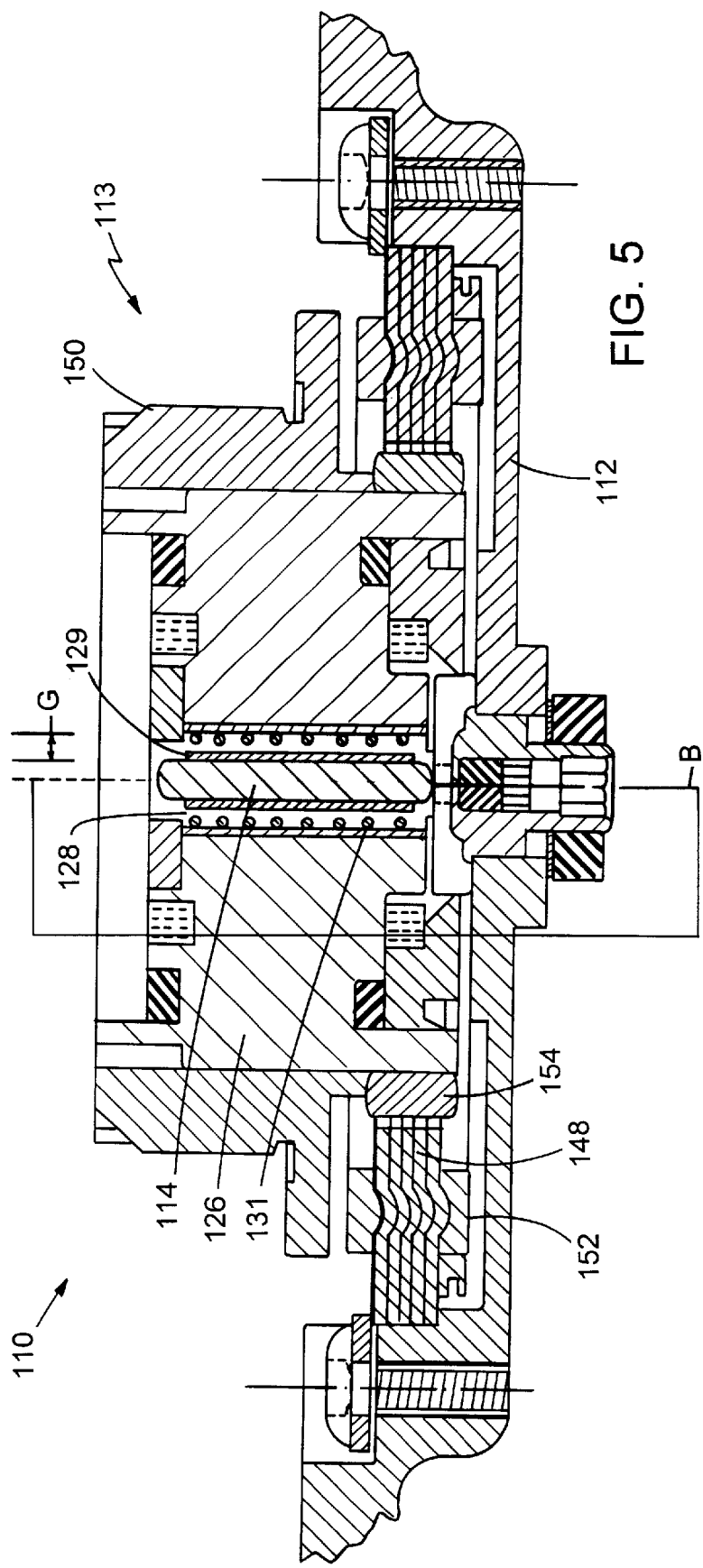
FIG. 5 is cross-sectional side view of a disc drive hydrodynamic spindle motor.

FIG. 5 shows a cross section through a reduced stiction hydrodynamic spindle drive motor. Spindle drive motor 110 is mounted to base 112 and includes a fixed shaft 114 which is screwed into base 112. Rotor hub assembly 113 includes hub sleeve 150 and rotor 126 which rotate about fixed shaft 114.

The outer surface of shaft 114 and the adjacent bore of rotor 126 together form hydrodynamic fluid bearing 128. Bearing gap G at hydrodynamic bearing 128 is typically about 0.5 microns to about 20 microns. Lubricating thin film 129 can be applied to the outer surface of shaft 114 to help alleviate wear between the shaft and rotor. Additionally, low surface energy film 131 can be applied to the bore surface of rotor 126 to reduce menisci forces in the null position.

During operation electrical signals supplied to windings 148 of strator assembly 152 create a magnetic field which interacts with permanent magnets 154 to cause rotor hub assembly 113 to rotate.

Figure 6:
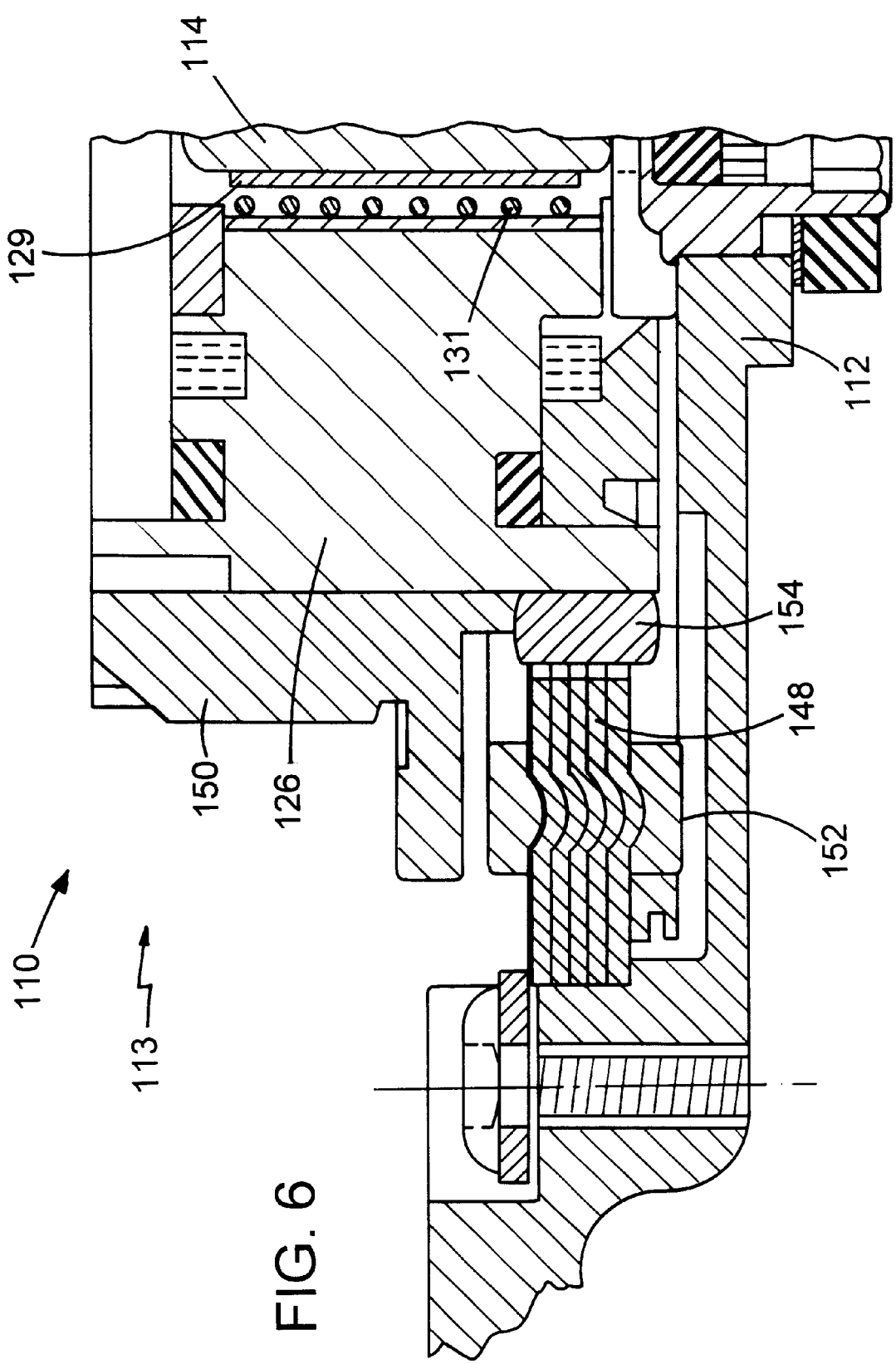
FIG. 6 is an expanded view of the disc drive hydrodynamic spindle motor about area B.

Referring to FIG. 6, an expanded view of box B of FIG. 5 illustrates motor 110 in the null condition. In this configuration, rotor 126, shaft 114, lubricating thin film 129, and low surface energy film 131 are in contact (arrow). However, the lubricant does not wet the shaft. This scenario is true as long as the surface energy of the low surface energy film is lower than the surface tension of the lubricant and any lubricant contaminants.

Still further embodiments are in the following claims.

What is claimed is:

1. A spindle drive motor including a drive mechanism means and a means for reducing stiction.

2. A reduced stiction drive mechanism for a spindle drive motor comprising:

a shaft and a rotor, with a lubricant between the shaft and rotor and arranged for relative motion, and a surface energy modifier between the lubricant and at least one of the shaft and rotor, wherein the surface energy modifier has a surface energy effective to reduce stiction.

3. The drive mechanism of claim 2, wherein the surface energy modifier has a surface energy lower than the surface tension of the lubricant.

4. The drive mechanism of claim 2, wherein the surface energy modifier has a thickness of about 1 nm to about 2000 nm.

5. The drive mechanism of claim 2, wherein the surface energy modifier has a surface energy of about 6 to about 14 dynes/cm.

6. The drive mechanism of claim 2, wherein the surface energy modifier is selected from the group consisting of a fluorochemical polymer in a fluorocarbon solvent, isosteric acid, and mixtures thereof.

7. The drive mechanism of claim 6, wherein the surface energy modifier is Fluorad or Nye Bar-Type K.

8. The drive mechanism of claim 2, wherein the lubricant is a fluorinated polyether, a hydrocarbon, an ester, atmosphere moisture or mixtures thereof.

9. The drive mechanism of claim 8, wherein the lubricant has a surface tension of about 12 to about 80 dynes/cm.

10. The drive mechanism of claim 2, wherein the lubricant has a thickness of about 1 nm to about 2000 nm.

11. The drive mechanism of claim 2, wherein the shaft and rotor are spaced apart by about 0.5 to about 20 microns.

12. A computer disc drive comprising:

a spindle drive motor for rotating storage media, the spindle drive motor including a shaft and a rotor arranged for relative motion, a lubricant between the shaft and rotor, and a surface energy modifier between the lubricant and at least one of the shaft and rotor, wherein the surface energy modifier has a surface energy effective to reduce stiction.

13. The computer disc drive of claim 12, wherein the surface energy modifier has a surface energy lower than the surface tension of the lubricant.

14. The computer disc drive of claim 12, wherein the surface energy modifier has a thickness of about 1 nm to about 2000 nm.

15. The computer disc drive of claim 12, wherein the surface energy modifier has a surface energy of about 6 to about 14 dynes/cm.

16. The computer disc drive of claim 12, wherein the surface energy modifier is a fluorochemical polymer in a fluorocarbon solvent.

17. The computer disc drive of claim 16, wherein the surface energy modifier is Fluorad, Nye Bar-Type K, isosteric acid, or mixtures thereof.

18. The computer disc drive of claim 12, wherein the lubricant is a fluorinated polyether, a hydrocarbon, an ester, atmosphere moisture or mixtures thereof.

19. The computer disc drive of claim 18, wherein the lubricant has a surface tension of about 12 to about 80 dynes/cm.

20. The computer disc drive of claim 12, wherein the lubricant has a thickness of about 1 nm to about 2000 nm.

* * * * *